No. 849,573. PATENTED APR. 9, 1907.
A. G. RITZ.
HITCHING STRAP CLAMP.
APPLICATION FILED APR. 17, 1906.
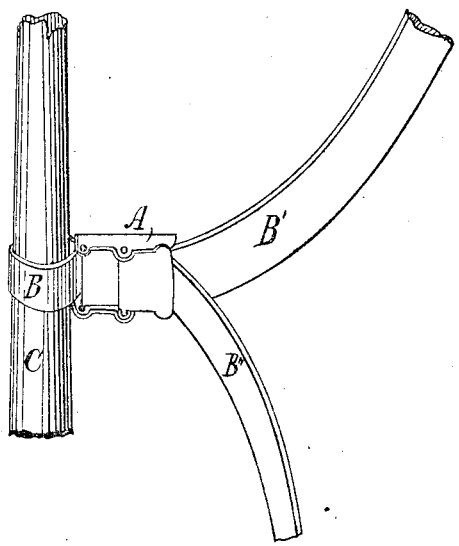
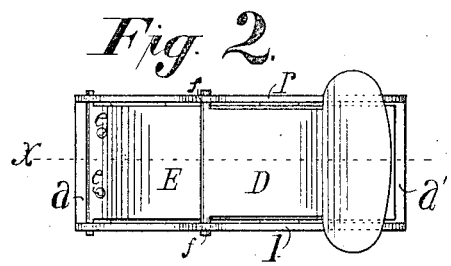
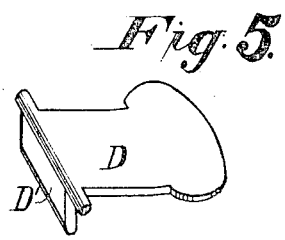
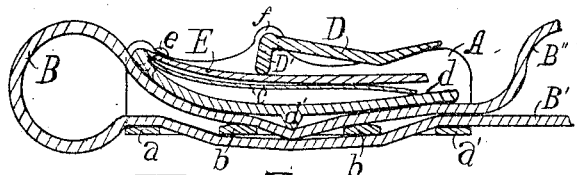
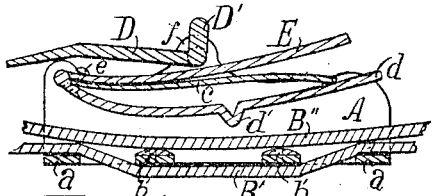
Witnesses
Dr José Montoya.
S. C. Taylor.
Inventor
Arthur G. Ritz
By A. D. Marble
His Attorney

UNITED STATES PATENT OFFICE.

ARTHUR G. RITZ, OF OKLAHOMA, OKLAHOMA TERRITORY.

HITCHING-STRAP CLAMP.

No. 849,573.

Specification of Letters Patent.

Patented April 9, 1907.

Application filed April 17, 1906. Serial No. 312,167.

*To all whom it may concern:*

Be it known that I, ARTHUR G. RITZ, a citizen of the United States, residing at Oklahoma city, in the county of Oklahoma and Territory of Oklahoma, have invented certain new and useful Improvements in Hitching-Strap Clamps, of which the following is a specification.

My invention relates to devices to aid in hitching horses, mules, and other animals where straps are used to hitch or tie with, and consists of two vertical sides having their lower edges joined to two end and two more centrally-located cross-bars; a pressing-plate pivoted in the upper rear corners of the sides and having a laterally-projecting rib midway its under surface, the said plate being rectangular and upwardly curved near its rear pivotal end; a thin rectangular spring, having one of its ends secured to the rear upper surface of the pressing-plate; a rectangular sheet-metal tongue, having its rear end slightly curved upward and secured to the end of the pressing-plate near its pivoted end; a clamping-lever pivoted in the upward ear projections of the sides in a manner to effectively clamp the strap.

The objects of the invention are, first, to provide a device to save time in hitching and unhitching horses, mules, and other animals; second, to provide a device which will prevent the animals from untying themselves; third, to prevent the tie-knot from being drawn so tight as to necessitate the cutting of the strap; fourth, to provide a convenient device by the use of which an animal may be hitched to a smooth vertical object, as a tree, a post, or a pole, without danger of the strap slipping down too low, and thus causing the animal to be annoyed or to break loose. I attain these objects by the mechanism illustrated in the accompanying drawings, forming a part of this specification, in which—

Figure 1 is a view in perspective of the device in use where the animal is hitched to a pole, the ends being broken away. Fig. 2 is a plan view of the device. Fig. 3 is a transverse sectional elevation on line $x$ of Fig. 2, showing the relative positions of the operating parts of the device as in use and locked. Fig. 4 is a view similar to Fig. 3, showing the relative positions of the various parts when the device is unlocked. Fig. 5 is a view in perspective of the locking or clamping lever.
Referring to the drawings, A designates the body of the hitching-strap clamp or device formed of the two equal parallel sides $r$ and $l$, having their lower edges united to the two end cross-bars $a$ $a'$ and the two more centrally-located cross-bars $b$ $b$, all of which may be cast or stamped from sheet metal and the sides turned at right angles to the cross-bars. In the latter case the cross-bars $b$ $b$ may have half-oval strips riveted upon their upper surfaces, as at $b'$, Fig. 4, to provide bearings for the hitch-straps not liable to injure them.

The portion of the hitching-straps designated as B′ is the portion attached to the animal and is passed through the spaces between the end cross-bars $a$ and $a'$ and the more central ones $b$ $b$, as shown in Figs. 3 and 4.

Near the upper rear corners of the sides $r$ and $l$ is pivoted the rear end of the pressing-plate $d$, being cast or pressed from sheet metal, rectangular in form, having an increasing curvature from front to rear, its central portion being the lowest where it has a lateral downwardly-projecting rib $d'$ to aid in securing the portion B″ of the hitching-strap firmly in place. The said pressing-plate is slightly shorter than the sides $r$ and $l$ and is adapted to a free movement between them.

To the upper surface and near the rear end of the pressing-plate $d$ is secured by the rivets $e$ $e$ the rectangular curved sheet-metal spring $c$ and the pressed-plate tongue E, having an upward curve each way from the center, the rear portion being the greater. The width of the spring $c$ and the tongue E equals that of the pressing-plate $d$, their length being slightly less.

The upper edges of the sides $r$ and $l$ have vertical ear-like extensions $f$, in which the clamp-lever or locking-lever D is pivoted and is adapted to move freely between the said sides. The front end of the said clamp-lever is oval, turned slightly upward, and is broader than the body, which has its portion rearward from the pivotal point turned downward at a right angle forming the cam member D′, by means of which the return portion B″ of the hitching-strap B is firmly held in position, as shown in Fig. 3, the tension of the spring $c$ in conjunction with the tongue E establishing the pressure upon the said strap and adapting the device to straps of varying thicknesses.

The inside width of the device is determined by the length of the cross-bars $a$ $a'$ and $b$ and is governed by the width of the straps upon which it is to be used.

In operation, having attached the hitching-strap to the animal to be hitched, pass the loose end of the strap through the spaces between the cross-bars of the device, as shown in Fig. 4, with the clamp-lever turned back, pass the end of the strap around the post or pole or other object, as in Fig. 1, and pass the strap back through the device, as shown in Fig. 4, and draw the strap tightly around the post or pole C and turn the clamp-lever D to the locking position, as indicated in Fig. 3. To unhitch the animal, turn the clamp-lever back to the position shown in Fig. 4, which releases the strap and permits of its being easily removed.

The device is adapted to remain upon the hitching-strap continuously wherever placed or it may be removed at will. It is designed to be used in stables as well as on the streets.

Having thus described my invention, what I claim as new and useful, and desire to secure by Letters Patent, is—

As an article of manufacture, a hitching-strap clamp embodying in combination the following elements; a body having two vertical side wall members with their lower edges joined together by cross-bars; a pressing-plate $d$ having its rear end upward curved and pivoted in the said side walls and having a lateral rib $d'$ midway its ends forming a part of its under surface; a rectangular sheet-metal spring $c$ secured upon the rear portion of the said pressing-plate by loose rivets $e\ e$; a rectangular tongue-plate E resting upon said spring and having one of its ends secured to the said pressing-plate by the rivets $e\ e$; the locking or clamping lever D pivoted in the ear projections $f$ of the side walls $r$ and $l$; the cam $D'$ forming the right-angled termination of the said locking or clamping lever, as shown and for the purposes set forth.

In testimony whereof I affix my signature in presence of two witnesses.

ARTHUR G. RITZ.

Witnesses:
BINNIE M. ZIEGLAR,
W. C. SHIPP.